United States Patent [19]

Heitz et al.

[11] Patent Number: 4,743,674

[45] Date of Patent: May 10, 1988

[54] AROMATIC POLYESTERS, PROCESSES FOR THEIR PREPARATION, AND THEIR USE FOR THE PREPARATION OF MOLECULARLY REINFORCED POLYMERS

[75] Inventors: Walter Heitz, Kirchhain; Uwe Kampschulte, Voerde; Ludwig Bottenbruch, Krefeld; Dieter Freitag, Krefeld; Hans-Rudolf Dicke, Krefeld, all of Fed. Rep. of Germany

[73] Assignee: Bayer Aktiengesellschaft, Leverkusen, Fed. Rep. of Germany

[21] Appl. No.: 939,945

[22] Filed: Dec. 9, 1986

[30] Foreign Application Priority Data

Dec. 18, 1985 [DE] Fed. Rep. of Germany ....... 3544694

[51] Int. Cl.$^4$ .............................................. C08G 63/60

[52] U.S. Cl. ..................................... 528/176; 528/171; 528/179; 528/190; 528/191; 528/193; 528/194

[58] Field of Search ............... 528/176, 179, 190, 191, 528/171, , 193, 194

[56] References Cited

U.S. PATENT DOCUMENTS 4,242,496 12/1980 Jackson et al. ...................... 528/190
4,414,380 11/1983 Swedo ................................. 528/173
4,614,790 9/1986 Hutchings et al. .................. 528/191

*Primary Examiner*—Lucille M. Phynes
*Attorney, Agent, or Firm*—Connolly & Hutz

[57] ABSTRACT

The invention relates to new aromatic polyesters based on terephthalic acid and hydroquinones, processes for their preparation from hydroquinone and terephthalic acid derivatives, and their use for the preparation of molecularly reinforced polymers.

5 Claims, No Drawings

AROMATIC POLYESTERS, PROCESSES FOR THEIR PREPARATION, AND THEIR USE FOR THE PREPARATION OF MOLECULARLY REINFORCED POLYMERS

The invention relates to new aromatic polyesters based on terephthalic acid and hydroquinones, processes for their preparation from hydroquinone derivatives and terephthalic acid, and their use for the preparation of molecularly reinforced polymers.

It is known that different polymers are, in general, molecularly miscible with one another only to a limited extent or not at all. Thus mixtures of two different polymers prepared, for example, at elevated temperature can separate into domains on cooling. This is particularly true for mixtures of liquid-crystalline polymers in other polymers.

It has now been found that specific substituted polyesters from hydroquinones and terephthalic acid are miscible and compatible with many other polymers and form homogeneous solutions and mixtures with one another over a wide temperature range from −30° to 250° C.

The invention thus relates to new polyesters of the formula (I)

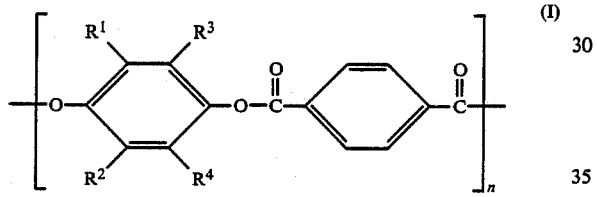

in which
the radicals $R^1$ and $R^4$, independently of one another, represent hydrogen, an arylalkyl-, arylalkylether-, arylalkylthioether radical having 2, 3, 4, 6, 7, 8, 9, or 10 carbon atoms in the alkyl chain which is unbranched and is substituted on the ω-carbon atom at the end of this chain with an unsubstituted aryl radical containing 6 to 24 carbon atoms and
n an integer from 5 to 2000, with the proviso that one of the radicals $R^1$ to $R^4$ must always be other than hydrogen.

As radicals $R^1$ to $R^4$, hydrogen and radicals of the formulae (II) to (VII)

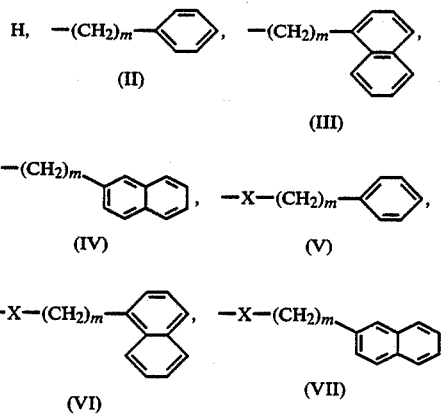

in which
m represents an integer from 2 to 10, preferably the number 2 or 3, and
X is oxygen (O) or sulphur (S) are preferably mentioned.

Radicals of the formula (II), (III), (IV) and (V) are particularly preferred, and radicals of the formula (II) are used particularly.

The new polyesters have molecular weights $M_n$ from 2,500 to $10^6$, preferably from 5,000 to 500,000.

The invention further relates to a process for the preparation of polyesters of the formula (I)

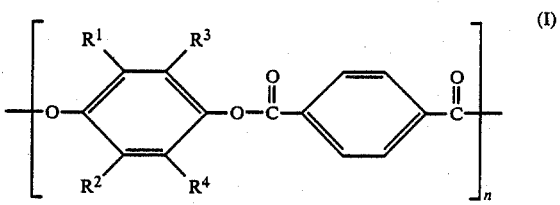

in which
the radicals $R^1$ and $R^4$, independently of one another, represent hydrogen, an aryalkyl-, arylalkylether-, arylalkylthioether radical having 2, 3, 4, 5, 6, 7, 8, 9 or 10 carbon atoms in the alkyl chain which is unbranched and is substituted on the ω-carbon atom at the end of this chain with an unsubstituted aryl radical containing 6 to 24 carbon atoms and
n represents an integer from 5 to 2000, with the proviso that one of the radicals $R^1$ to $R^4$ must always be other than hydrogen characterized in that hydroquinones of the formula (VIII)

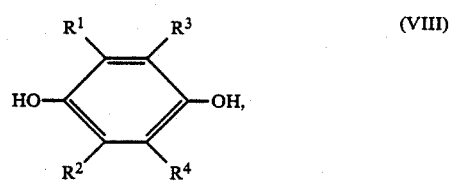

in which
the radicals $R^1$ to $R^3$ have the meaning stated for formula (I),
(a) are reacted with terephthalic acid derivatives, such as the halides of the formula (IX)

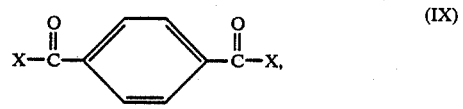

in which
X represents halogen, such as Cl, Br, if appropriate in conventional organic solvents at temperatures from 0° to 250° C., preferably 20° to 150° C., in the presence of at least equivalent amounts of a tert.-amine (relative to the terephthalic acid derivative of the formula (IX)), or
(b) acylated hydroquinones of the formula (VIIIb)

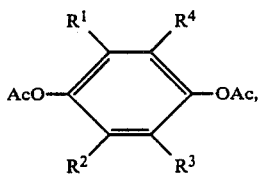
(VIIIb)

in which
the radicals $R^1$ to $R^4$ have the meaning stated for formula (I) and Ac represents $C_1$–$C_{10}$—CO,
and terephthalic acid of the formula (IXa)

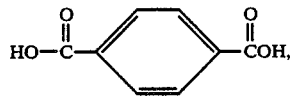
(IXa)

are reacted with one another, if appropriate in conventional organic solvents at temperatures from 50° to 350° C. or in the melt in the absence of solvents at temperatures from 50° to 400° C., or (c) hydroquinones of the formula (VIII) are reacted with esters, preferably aryl esters of terephthalic acid of the formula (IXb)

(IXb)

in which
$R^5$ represents $C_1$–$C_4$-alkyl, $C_6$–$C_{24}$-aryl, $C_7$–$C_{30}$-aralkyl or $C_7$–$C_{30}$-alkylaryl, preferably $C_6$–$C_{24}$-aryl,
in the presence of conventional transesterification catalysts in conventional solvents, if appropriate under a partial vacuum of 0.1 to $10^{-4}$ bar.

Suitable conventional organic solvents for methods a, b and c are, for example, chlorinated hydrocarbons, such as carbon tetrachloride, perchloroethylene, chloroform and dichloromethane, aromatic solvents, such as toluene, diphenyl ether, chloronaphthalene and diphenyl sulphone, ketones, such as acetone and butanone, etc.

In method (a), tertiary amines, for example pyridine, triethylamine, etc., must be present in at least equivalent amounts relative to the terephthalic halide. If appropriate, the tertiary amine can be employed as solvent.

The solution of the terephthalic halide, for example in toluene, is added dropwise to the solution of the substituted hydroquinone in, for example, toluene/pyridine, and the solution is subsequently warmed to temperatures of, for example, 100° C. for one hour. The polymer is filtered off and freed from organic solvents and salts by washing with water and alcohol (for example methanol).

In method (Ic), a conventional catalyst which can influence transesterification reactions must be present in the reaction mixture in amounts from 0.001 to 0.1 mole relative to terephthalic acid ester of the formula (IXb).

Conventional transesterification catalysts, for example metal salts and compounds such as manganese acetate, zinc chloride, titanium tetrapropylate or dibutyltin dilaurate, or combinations of catalysts, such as zirconium tetrapropylate/4-dimethylaminopyridine, or metals, such as mangesium, can be used. The reaction is carried out in high-boiling solvents, such as naphthalene methyl ether, but is preferably carried out without solvent. The reactants are heated to about 300° C., preferably to just under the melting point of the polymer which is formed, for 1 to 5 hours and are then condensed under reduced pressure at 280° to 350° C.

Approximately 1 mole of terephthalic acid of the formula (IX) is employed per mole of hydroquinone of the formula (VIII).

The polymerization reactions a, b and c can be carried out in a conventional manner.

The polymers according to the invention can be counted amongst the liquid-crystalline polymers. However, they are not, like known liquid-crystalline polymers, highly crystalline, sparingly soluble and poorly compatible with other polymers.

The polymers according to the invention can, in contrast, be dissolved in other polymers (molecularly disperse) in amounts from 0.5 to 20% by weight, relative to to the other polymers to be mixed).

The polymers according to the invention can be incorporated into a large number of other polymers, for example into polycarbonates, polyepoxides, ABS, Macrolon, polyphenylene sulphide, Ryton ®, polyether ether ketones, polyamides, polyesters, polyethylene, PVC, polyurethanes, ABN, rubbers, copolymers, for example ethylene vinyl acetate, etc.

To incorporate the polymers according to the invention, the latter can be heated with the polymers to be mixed to elevated temperatures up to about 400° C., for example after grinding. On cooling to room temperature, a homogeneous mixture (alloy) is then obtained.

The polymer mixtures prepared using the polymers according to the invention have excellent heat distortion resistance over a wide temperature range from −100° to about 200° C., good notched impact strengths, moduli of elasticity, high scratch-resistance and excellent shear strength.

Furthermore, the polyesters of the formula (I) according to the invention can, for example, be dissolved in a monomer such as styrene, methylstyrene, methyl methacrylate, epoxides, diisocyanates/diol systems or monomer mixtures such as styrene/acrylonitrile, etc., and this monomer is then subsequently polymerized. The polymerization of the monomers occurs under conventional conditions. Thus, vinyl monomers are polymerized by addition of radical initiators, epoxides by addition of polyamines and diisocyanate/diol systems by addition of tin catalysts. A good polymer/-polymer mixture is produced. Furthermore, the mixtures can also occur via a common solvent.

Because of their property profile, such mixtures can be utilized for a large number of possible uses, for example for the production of materials, injection-moulded parts, foils, films, fibres and threads, etc.

EXAMPLE 1 g of (2-phenyl)ethylene-hydroquinone is initially introduced in a mixture of 1.25 ml of pyridine and 15 ml of methylene chloride, and 0.95 g of terephthalic dichloride, dissolved in 15 ml of methylene chloride, is added. The batch is stirred for 24 hours at 25° C., 60 ml of acetone are added, and the batch is stirred for a further 12 hours. The polymer is treated with water and acetone and the low-molecular-weight components and the residual HCl are extracted in a Soxhlet using methanol. 1.21 g of polymer are obtained, and this, after drying, is stoved at 200° C. and 10⁻³ Torr for 5 hours to increase the molecular weight.

During the 1st heating process in DSC (differential scanning calorimetry), the polymer exhibits a glass transition temperature of 240° C., a melting point of 320° C. and a verification temperature of 470° C.

We claim:
1. Polyesters of the formula (I)

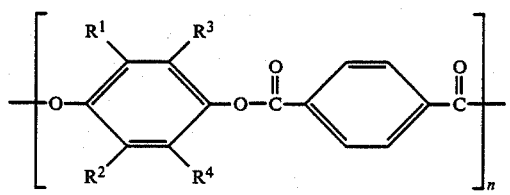

in which
the radicals $R^1$ and $R^4$, independently of one another, represent hydrogen; an arylalkyl-, arylalkylether-, arylalkylthioether radical having 2, 3, 4, 5, 6, 7, 8, 9 or 10 carbon atoms in the alkyl chain which is unbranched and is substituted on the ω-carbon atom at the end of this chain with an unsubstituted aryl radical containing 6 to 24 carbon atoms and
n represents an integer from 5 to 2000, with the proviso that one of the radicals $R^1$ to $R^4$ must always be other than hydrogen.

2. Process for the preparation of polyesters of the formula (I)

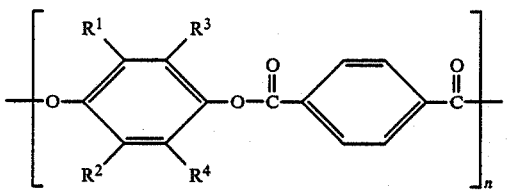

in which
the radicals $R^1$ and $R^4$, independently of one another, represent hydrogen, an arylalkyl-, arylalkylether-, arylalkylthioether radical having 2, 3, 4, 5, 6, 7, 8, 9 or 10 carbon atoms in the alkyl chain which is unbranched and is substituted on the ω-carbon atom at the end of this chain with an unsubstituted aryl radical containing 6 to 24 carbon atoms and
n represents an integer from 5 to 2000, with the proviso that one of the radicals $R^1$ to $R^4$ must always be other than hydrogen, characterized in that hydroquinones of the formula (VIII)

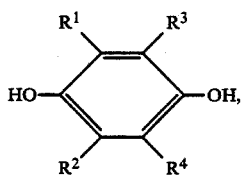

in which
the radicals $R^1$ to $R^3$ have the meaning stated for formula (I), (a) are reacted with terephthalic acid derivatives, such as the halides of the formula (IX)

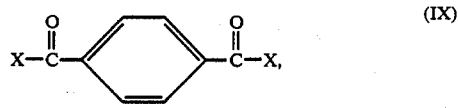

in which
X represents halogen, such as Cl, Br, if appropriate in conventional organic solvents at temperatures from 0° to 250° C., in the presence of equivalent amounts of a tert.-amine (relative to the terephthalic acid derivative of the formula (IX) or
(b) acylated hydroquinones of the formula (VIIIb)

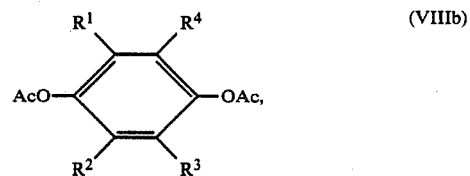

in which
the radicals $R^1$ to $R^4$ have the meaning stated for formula (I) and
Ac represents $C_1$-$C_{10}$—CO and terephthalic acid of the formula (IXa)

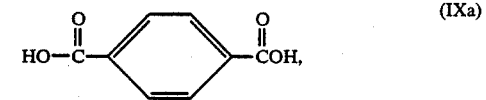

are reacted with one another, if appropriate in conventional organic solvents at temperatures from 50° to 200° C. or in the melt in the absence of solvents at temperatures from 150° to 250° C. or
(c) hydroquinones of the formula (VIII) are reacted with esters, preferably aryl esters of terephthalic acid of the formula (IXb)

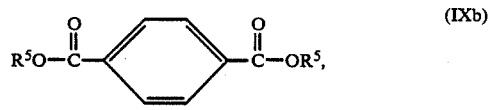

in which
$R^5$ represents $C_1$-$C_4$-alkyl, $C_6$-$C_{24}$-aryl, $C_7$-$C_{30}$-aralkyl, $C_7$-$C_{30}$-alkylaryl,
in the presence of conventional transesterification catalysts in conventional solvents, if appropriate under a partial vacuum of 0.1 to 10⁻⁴ bar.

3. Use of polyesters according to claim 1 for mixing with other polymers, if appropriate as an additive to the polymerizing monomer solution during the preparation of the polymer.

4. Mixture, with other polymers, of polyesters according to claim 1.

5. A process for the preparation of mixtures according to claim 4, characterized in that the polyesters according to claim 1 are dissolved in monomers which are polymerized afterwards.

* * * * *